United States Patent
Beeckman et al.

(10) Patent No.: US 9,597,655 B2
(45) Date of Patent: Mar. 21, 2017

(54) BORON SELECTIVATED MOLECULAR SIEVES AND THEIR USE IN SORPTIVE SEPARATIONS

(71) Applicants: Jean W. Beeckman, Columbia, MD (US); Ivy D. Johnson, Lawrenceville, NJ (US); Natalie A. Fassbender, Nazareth, PA (US); Tilman W. Beutel, Neshanic Station, NJ (US); Nadya A. Hrycenko, Clinton, NJ (US); Randolph J. Smiley, Hellertown, PA (US); Peter I. Ravikovitch, Princeton, NJ (US)

(72) Inventors: Jean W. Beeckman, Columbia, MD (US); Ivy D. Johnson, Lawrenceville, NJ (US); Natalie A. Fassbender, Nazareth, PA (US); Tilman W. Beutel, Neshanic Station, NJ (US); Nadya A. Hrycenko, Clinton, NJ (US); Randolph J. Smiley, Hellertown, PA (US); Peter I. Ravikovitch, Princeton, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 14/945,516

(22) Filed: Nov. 19, 2015

(65) Prior Publication Data

US 2016/0167013 A1    Jun. 16, 2016

Related U.S. Application Data

(60) Provisional application No. 62/091,698, filed on Dec. 15, 2014.

(51) Int. Cl.
*B01D 53/02* (2006.01)
*C01B 39/02* (2006.01)
*B01J 20/18* (2006.01)
*C01B 39/48* (2006.01)

(52) U.S. Cl.
CPC .............. *B01J 20/18* (2013.01); *B01D 53/02* (2013.01); *C01B 39/026* (2013.01); *C01B 39/48* (2013.01); *B01D 2253/116* (2013.01); *B01D 2256/245* (2013.01); *B01D 2257/102* (2013.01); *B01D 2257/304* (2013.01); *B01D 2257/40* (2013.01); *B01D 2257/504* (2013.01)

(58) Field of Classification Search
CPC .............. B01D 53/02; B01D 2253/116; B01D 2253/108; B01D 2253/1085; B01D 2256/245; B01D 2257/102; B01D 2257/304; B01D 2257/40; B01D 2257/504; B01J 20/18; C01B 39/026; C01B 39/48
USPC ..... 96/153; 95/128, 136, 139, 902; 423/230; 585/820

See application file for complete search history.

(56) References Cited

U.S. PATENT DOCUMENTS

| | | | |
|---|---|---|---|
| 4,067,920 A | | 1/1978 | Kaeding |
| 4,613,720 A | * | 9/1986 | Bonifaz .................. B01J 29/50 502/63 |
| 4,661,467 A | * | 4/1987 | Kuehl ...................... B01J 29/86 423/277 |
| 4,698,217 A | | 10/1987 | Valyocsik |
| 5,077,253 A | * | 12/1991 | Chu ......................... B01J 33/00 502/61 |
| 7,326,818 B2 | | 2/2008 | Beeckman et al. |
| 2005/0036295 A1 | | 2/2005 | Beeckman et al. |
| 2008/0282885 A1 | | 11/2008 | Deckman et al. |
| 2014/0157984 A1 | | 6/2014 | Deckman et al. |
| 2015/0321182 A1 | * | 11/2015 | Madgavkar .............. B01J 29/40 585/417 |

FOREIGN PATENT DOCUMENTS

CN    104084233 A    10/2014

OTHER PUBLICATIONS

PCT/US2015/061457 International Search Report and Written Opinion dated Feb. 18, 2016.

* cited by examiner

*Primary Examiner* — Frank Lawrence
(74) *Attorney, Agent, or Firm* — David M. Weisberg

(57) ABSTRACT

A composition is described comprising a molecular sieve having pores defined by channels formed by one or more 8-membered rings of tetrahedrally coordinated atoms, such as a DDR-type molecular sieve, and an amorphous deposit of a boron compound on the molecular sieve.

23 Claims, 1 Drawing Sheet

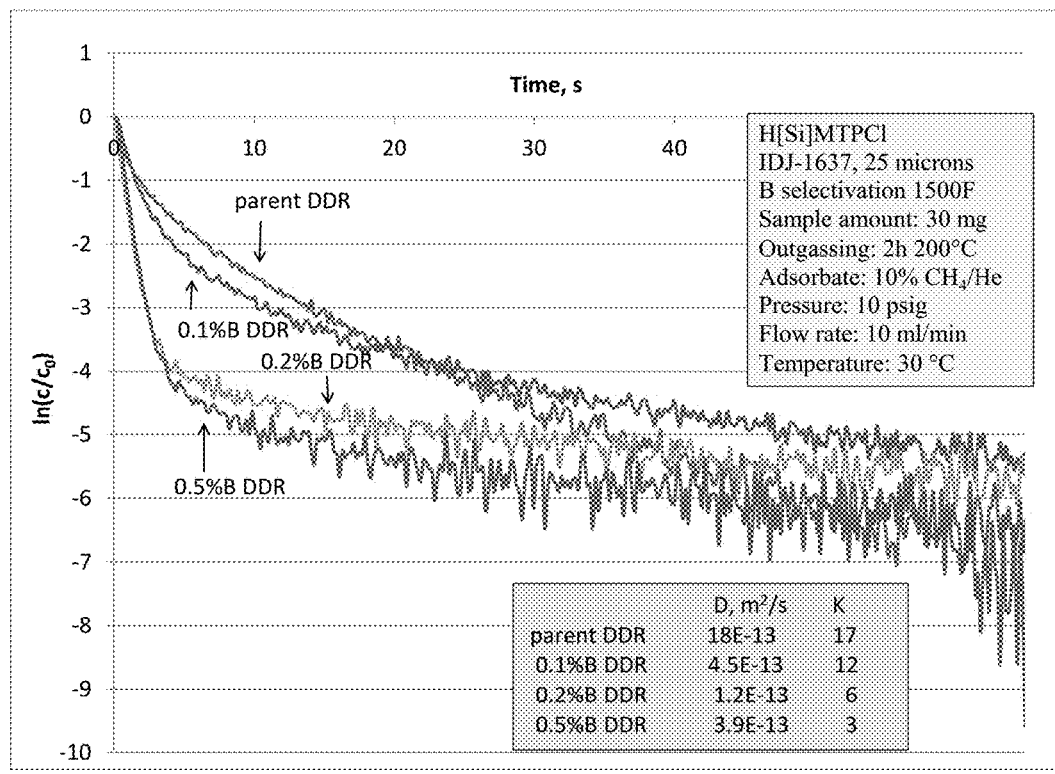

US 9,597,655 B2

BORON SELECTIVATED MOLECULAR SIEVES AND THEIR USE IN SORPTIVE SEPARATIONS

CROSS-REFERENCE TO RELATED APPLICATIONS

This application claims the benefit of provisional U.S. Ser. No. 62/091,698, filed Dec. 15, 2014, the entire contents of which are expressly incorporated by reference herein.

FIELD OF THE INVENTION

This invention relates to boron-selectivated molecular sieves and their use in sorptive separations.

BACKGROUND

Molecular sieves have found a wide range of applications within refinery processes and other processes for manipulating petroleum streams. Some applications are catalytic in nature, while other applications focus on the ability of molecular sieves to selectively adsorb certain molecules within a gas stream.

One example of selective adsorption of molecules from a gas phase stream involves the use of a zeolite or another microporous material to remove contaminants from a stream containing hydrocarbons or other small gas phase organic molecules. For example, many natural gas streams contain at least some $CO_2$ in addition to the desired $CH_4$. Additionally, many refinery processes generate a gas phase output that includes a variety of species, such as $CH_4$ and $CO_2$, that are gases at standard temperature and pressure. Performing a separation on a gas phase stream containing $CH_4$ can allow for removal of an impurity and/or diluent such as $CO_2$ or $N_2$ under controlled conditions.

For example, U.S. Patent Application Publication No. 2008/0282885 describes systems and methods for removing $CO_2$, $N_2$, or $H_2S$ from a gas mixture containing $CH_4$, such as natural gas, using a swing adsorption process. One type of adsorbent that can be used in the swing adsorption process is an 8-ring molecular sieve, such as a DDR-type zeolite.

One problem hindering the commercial application of 8-ring molecular sieves, such as DDR-type zeolites, in the sorptive separation of impurities, such as $CO_2$, from gas mixtures containing $CH_4$ is that the diffusivity of the methane into most 8-ring molecular sieves is too high, often by an order of magnitude. There is therefore a need to reduce the methane diffusivity of these molecular sieves while at the same time maintaining the capacity of the molecular sieve for $CO_2$ uptake.

SUMMARY

According to the invention it has now been found that by depositing a boron compound on an 8-ring molecular sieve, such as a DDR-type zeolite, the methane diffusivity of the molecular sieve can be reduced, often without significant reduction in the capacity of the molecular sieve to adsorb $CO_2$.

Thus, in one aspect, the invention resides in a composition comprising a molecular sieve having pores defined by channels formed by one or more 8-membered rings of tetrahedrally coordinated atoms and an amorphous deposit of a boron compound on the molecular sieve.

In another aspect, the invention resides in a composition comprising a DDR-type molecular sieve and an amorphous deposit of a boron compound on the molecular sieve.

In a further aspect, the invention resides in a DDR-type molecular sieve having a methane diffusivity of less than ~10E-13 $m^2$/sec at a temperature of 30° C. and a methane partial pressure of ~0.17 bar (~17 kPa).

In yet a further aspect, the invention resides in a method for performing a gas separation comprising: contacting the molecular sieve described herein with an input gas stream containing a first component and a second component to form a product gas stream enriched in the first component relative to the input gas stream.

BRIEF DESCRIPTION OF THE DRAWINGS

FIG. 1 is a graph showing the zero length chromatography results for the diffusion of methane in ZSM-58 both without boron selectivation and with the boron selectivation of Examples 1-3.

DETAILED DESCRIPTION OF THE EMBODIMENTS

Described herein is an 8-ring molecular sieve which has been modified by deposition of a boron compound so as to increase the kinetic selectivity of the molecular sieve for the adsorption of $CO_2$ in preference to $CH_4$ from a mixture containing the same. Also described is a process of performing gas separation in which the selectivated molecular sieve is contacted with an input gas stream containing a first component, such as $CH_4$, and at least one second component, such as $CO_2$, $N_2$, and/or $H_2S$, to form a product gas stream enriched in the first component relative to the input gas stream.

As used herein the term 8-ring molecular sieve refers to any molecular sieve having 8-member rings of tetrahedra as the largest ring size. A large number of molecular sieves have 8-member rings of tetrahedra as the largest ring size and are suitable for use in the present process.

The Structure Commission of the International Zeolite Association has assigned three letter framework type codes to all molecular sieves of known structure. Frequently, different names have been assigned to materials having the same framework type, such materials being referred to as isotypes. This may occur in cases where the materials have a composition different from the material which was the basis for the original assignment of the framework type code. As an example, the framework type code CHA is derived from the zeolite mineral chabazite. The CHA framework type has the following isotypes: $AlPO_4$-(CHA), CaAPO-44, CaAPO-47, $GaPO_4$-34, LZ-218, Linde D, Linde R, MeAPO-47, MeAPSO-47, Phi, SAPO-34, SAPO-47, Si-CHA, SSZ-13, Wilhendersonite, ZK-14 and ZYT-6, in addition to the material chabazite. A description of these structures, their type codes, and a listing of their isotypes are given in *Atlas of Zeolite Framework Types* by Ch. Baerlocher et al., Elsevier, 2007, which is incorporated by reference herein.

A partial listing of such 8-member ring structures, taken from *Atlas of Zeolite Framework Types*, is given below:

| 8-Member Ring Structures | |
|---|---|
| ABW | Li-A (Barrer and White) |
| AEI | $AlPO_4$-18 |

8-Member Ring Structures

| | |
|---|---|
| AFX | SAPO-56 |
| APC | AlPO$_4$-C |
| ATN | MAPO-39 |
| ATT | AlPO$_4$-12 |
| ATV | AlPO$_4$-25 |
| AWW | AlPO$_4$-22 |
| CHA | Chabazite, SSZ-13 |
| DDR | Deca-dodecasil 3R |
| EAB | TMA-E |
| ERI | Erionite |
| JBW | NaJ (Barrer and White) |
| KFI | ZK-5 |
| LEV | Levyne |
| LTA | Linde Type A |
| MER | Merlinoite |
| PAU | Paulingite |
| PHI | Phillilpsite |
| RHO | Rho |
| RTE | RUB-3 |
| RTH | RUB-3 |
| ZON | ZAPO-M1 |
| ITE | ITE-3 |

In some embodiments, the molecular sieves for use as the adsorbents described herein can comprise or be molecular sieves of the DDR framework type, which have pores defined by intersecting 8-membered ring channels having cross sectional dimensions of ~3.6 Å by ~4.4 Å. DDR framework-type molecular sieves include a number of isotypes, including ZSM-58, Sigma-1, and/or SSZ-28. A particular DDR framework-type molecular sieve is ZSM-58, the composition and synthesis of which is described U.S. Pat. No. 4,698,217 incorporated herein by reference in its entirety.

In some embodiments, the 8-membered ring molecular sieve employed herein can be substantially free of acid sites. Thus, for example, where the molecular sieve is an aluminosilicate zeolite, it may be desirable to ensure that the material has a silica to alumina molar ratio in excess of 100, such as in excess of 1000.

The molecular sieve, which is subjected to the selectivation treatment described herein, may be combined with a binder material prior to contact with the boron compound. This binder material can advantageously be an inert, non-alumina binder material, such as a silica binder. Optionally, however, the molecular sieve may be selectivated in the unbound state. Thus, one particular process for introducing the boron compound into molecular sieve can be by impregnation, in which the bound or unbound-molecular sieve can be allowed to contact a solution of the boron compound in a solvent, such as water. Thereafter, the solvent can be removed, such as by evaporation, and the boron-containing molecular sieve heated to the desired calcination temperature.

An alternative process for contacting the molecular sieve with the boron compound can comprise the steps of mulling and then extruding a mixture comprising water, the molecular sieve, and a boron compound under conditions sufficient to form an extrudate having an intermediate green strength sufficient to resist attrition during subsequent processing. The extruded mixture can then be heated to drive off the water and then the molecular sieve reacted with the boron compound. If desired, the extruded mixture may undergo intermediate processing, such as, for example, contacting the extruded mixture with an aqueous solution comprising ammonium cations under conditions sufficient to exchange cations in molecular sieve with ammonium cations and calcining the ammonium exchanged extruded mixture under conditions sufficient to generate the hydrogen form of said sieve.

Where the treating boron compound is a liquid, such compound can be in solution in a solvent at the time contact with the molecular sieve can be effected. Any solvent relatively inert with respect to the treating compound and the molecular sieve may be employed. Suitable solvents can include, but may not be limited to, water and aliphatic, aromatic, or alcoholic liquids. Where the boron-containing compound is, for example, an organoboron compound such as trimethylborate, a hydrocarbon solvent such as n-octane may be employed. In some embodiments, the boron-containing compound may be used without a solvent, i.e., may be used as a neat liquid.

In addition to the liquid phase contacting processes so far described, the combination of the boron compound with the molecular sieve can be conducted in the gaseous phase. Where the boron-containing compound is in the gaseous phase, such as where gaseous diborane is employed, the treating compound can be used by itself or can be used in admixture with a gaseous diluent inert to the boron-containing compound and the molecular sieve, such as nitrogen or helium, and/or with an organic solvent, such as octane.

The molecular sieve may be selectivated with boron by single or multiple treatments with the boron compound, each treatment (or at least the last treatment) being followed by calcination of the treated material in an oxygen containing atmosphere, e.g., air. For example, the catalyst may be treated at least twice, e.g., at least 3 times, such as from 4 to 6 times, with a liquid medium comprising a liquid carrier and at least one boron compound. The liquid carrier may be water, an organic liquid, or a combination of water and an organic liquid. Particularly, when the liquid medium comprises an emulsion of the boron compound in water, the liquid medium may also comprise an emulsifying agent, such as a surfactant.

Representative boron-containing compounds, which can be used in the selectivation process of the invention, can include but are not necessarily limited to boric acid, trimethylborate, boron hydride, boron oxide, boron sulfide, butylboron dimethoxide, butylboronic acid, dimethylboric anhydride, hexamethylborazine, phenylboric acid, triethylborane, tetramethylammonium borohydride, triphenyl boron, allylborate, and combinations thereof. An embodiment of the invention concerns using boric acid as the boron compound, because of its low acidity and melt characteristics, i.e., boric acid ($H_3BO_3$) at about 150° C. forms boric oxide ($B_2O_3$), which at about 500° C. forms a molten phase.

Prior to contacting the molecular sieve with the boron-containing compound, the catalyst may be dried. Drying can be effected in the presence of air or any suitable medium. Elevated temperatures may be employed. However, the temperature should not be so severe as to destroy or significantly degrade the crystal structure of the molecular sieve.

After contacting with the boron-containing compound, the molecular sieve can be calcined by heating to a temperature in excess of 500° C., typically from about 550° C. to about 850° C., such as from about 649° C. to about 816° C. (about 1200° F. to about 1500° F.). By heating at such temperatures, it is believed that the boron compound can react with the molecular sieve and, upon cooling and solidification, can partially block the pores of the molecular sieve, thereby creating an effective diffusion barrier.

When the molecular sieve is pre-selectivated by a multiple impregnation technique, the molecular sieve is heated after each impregnation to remove the carrier. Following each or the final impregnation, the molecular sieve may be heated at a rate of from about 0.2° C./minute to about 5° C./minute to a temperature greater than 500° C., but below the temperature at which the crystallinity of the molecular sieve is adversely affected. The duration of calcination at the calcination temperature may be any reasonable time, e.g., from about 1 hour to about 24 hours or from about 2 hours to about 6 hours.

The impregnated molecular sieve may be calcined in an inert or oxidizing atmosphere. An example of such an inert atmosphere can be a nitrogen, i.e., $N_2$, atmosphere. An example of an oxidizing atmosphere can be an oxygen-containing atmosphere, such as air. Calcination may take place initially in an inert, e.g., $N_2$, atmosphere, followed by calcination in an oxygen-containing atmosphere, such as air or a mixture of air and $N_2$. Calcination can advantageously be performed in an atmosphere substantially free of water vapor to avoid uncontrolled/undesirable steaming of the molecular sieve. The molecular sieve may be calcined once or more than once following each impregnation. The various calcinations following each impregnation need not be identical, but may vary with respect to the temperature, the rate of temperature rise, the atmosphere, and the duration of calcination.

Although the amount of boron incorporated with the molecular sieve can vary, the selectivated molecular sieve can usually contain at least 10 wppm, such as at least 500 wppm, for example at least 1000 wppm of elemental boron. In some embodiments, the selectivated molecular sieve may contain up to 10000 wppm, such as up to 5000 wppm, for example up to 1300 wppm of elemental boron.

The amount of boron incorporated with the molecular sieve by reaction with a boron-containing compound can depend upon several factors. One of these can be the reaction time, i.e., the time that the molecular sieve and the boron-containing source are maintained in contact with each other. With greater reaction times, all other factors being equal, a greater amount of boron can be incorporated with the molecular sieve. Other factors upon which the amount of boron incorporated with the molecular sieve can be dependent can include, but are not necessarily limited to, reaction temperature, concentration of the treating compound in the reaction mixture, the degree to which the molecular sieve has been dried prior to reaction with the boron-containing compound, the conditions of drying of the molecular sieve after reaction of the molecular sieve with the treating compound, and the amount and type of binder incorporated with the molecular sieve, inter alia.

The boron may not be present on the selectivated molecular sieve as elemental boron but may be present as a boron compound, such as an oxide of boron and/or a partially decomposed version thereof. Without being bound by any particular theory, it is believed that the selectivity of the molecular sieve as an adsorbent can be improved by the boron compound being inserted into (or at least blocking) the pore structure of the molecular sieve. By entering (blocking) the pore structure, it is believed that the boron compound can influence the effective pore mouth area and/or pore volume available for entry of a potential adsorbate into the molecular sieve. Thus, even though two potential adsorbates may have sizes suitable for adsorption into the pore network of the molecular sieve, the presence of the boron compound can alter the relative ability of the different potential adsorbates to enter into and/or move within the pores of the molecular sieve. Optionally, the boron compound may additionally or alternately contribute to formation of a barrier layer on the surface of the molecular sieve. Such an optional barrier layer may alter the ability of potential adsorbates to enter (block) the pores of the molecular sieve.

The boron selectivation of the present invention can impart distinct changes (about 4-10 orders of magnitude) in the diffusion characteristics of the molecular sieve. One technique for investigating the adsorption properties of an adsorbent is zero length chromatography. Zero length chromatography (ZLC) determines diffusion coefficients from measurements of rates at which adsorbed molecules are purged from samples after rapidly switching from adsorption to desorption conditions. Analysis of zero length chromatography data methods is described, e.g., by D. M. Ruthven in "Principles of Adsorption and Adsorption Processes", John Wiley, NY (1984) and by J. Karger and D. M. Ruthven in "Diffusion in Zeolites and Other Microporous Solids", John Wiley, NY (1992). In particular, the boron selectivation described herein can reduce the ZLC methane diffusivity of ZSM-58 from a typical unselectivated value of ~15-20E-13 $m^2$/sec to less than ~10E-13 $m^2$/sec, even less than ~1E-13 $m^2$/sec, at a temperature of ~30° C. and ~0.17 bar (~17 kPa) methane partial pressure.

In some advantageous embodiments, the boron selectivation does not significantly alter the adsorption capacity of the molecular sieve for the desired adsorbate, such as $CO_2$. In certain embodiments, the presence of the boron deposit may only reduce the adsorption capacity of the molecular sieve by ~40% or less, e.g., by less than ~20% or by less than ~10%. Even though the adsorption capacity can be somewhat reduced by the boron deposit layer in such embodiments, the performance of the molecular sieve can improve, presumably because of improvements in kinetic selectivity.

The boron selectivated molecular sieves described herein can be used to perform separations on a variety of gas phase feeds. One example of a gas phase feed can include a natural gas feed/stream, such as a natural gas feed produced at a petroleum production site, or a natural gas feed/stream from a gas field and/or shale gas formation. Natural gas feeds can typically contain methane, optionally some larger hydrocarbons such as $C_2$-$C_4$ hydrocarbons, $CO_2$, and optionally one or more additional components such as $N_2$, $H_2S$, $H_2O$, and mercaptans. A natural gas feed may optionally also contain one or more substances introduced as part of the process for extracting the natural gas at the production site. Non-limiting examples of such substances can include glycols such as ethylene glycol, amines such as methyl diethyl amine, dimethyl disulfide, and combinations thereof.

Improvements in the recovery of the light component created by selectivation of adsorbents or membranes can be valuable for processes used to remove impurities from natural gas streams, particularly high pressure natural gas streams. It can be desirable to recover the impurities, also referred to as the "heavy component(s)", and the methane-rich product, also referred to as the "light component", at as high a pressure as practical for operability in natural gas processing. Depending on the embodiment, a swing adsorption process using a selectivated adsorbent can be used to obtain methane recovery of greater than about 80 mol %, e.g., greater than about 85 mol %, greater than about 90 mol %, or greater than about 95 mol %, even when the natural gas is fed at relatively high inlet pressures, such as greater than about 50 psig (about 350 kPag), e.g., at least about 150 psig (about 1.0 MPag), at least about 450 psig (about 3.1 MPag), at least about 600 psig (about 4.1 MPag), or at least about 1200 psig (about 8.3 MPag). The composition of natural gas streams directly from an underground field (raw natural gas) can vary from field to field. In order to produce a gas that can be introduced into a pipeline for sale to residential and commercial fuel markets contaminants, such as $N_2$, Hg, mercaptans, and acid gases $CO_2$ and/or $H_2S$, should be removed to acceptable levels. The levels and impurity types can vary from gas field to gas field and, in some cases, can comprise the majority of molecules in the produced gas. For example, it is not uncommon for some natural gas fields to contain from about 0 mol % to about 90 mol % $CO_2$, more typically from about 10 mol % to about 70 mol % $CO_2$.

Other examples of suitable gas phase feeds can include a flue gas and/or a fuel gas from a refinery process. A variety of processes can generate a flue gas and/or fuel gas including $CO_2$ and small hydrocarbons, such as $CH_4$. Depending on the source of the flue/fuel gas, it/they may also contain $H_2S$, $H_2$, $N_2$, $H_2O$, and/or other components that are gas phase at standard conditions. Components such as $CO_2$ and $N_2$ can act as diluents reducing the value of such flue gas and/or fuel gas streams.

In order to improve the value of a gas phase stream, a separation can be performed to generate at least two product streams. A first product stream corresponding to the light component can be enriched in a desired product, such as $CH_4$ and/or other hydrocarbons, such as other hydrocarbons generally, other hydrocarbons containing 4 or fewer carbon atoms, or other hydrocarbons containing 3 or fewer carbon atoms. In certain advantageous embodiments, the other hydrocarbon can include at least one saturated carbon-carbon bond. A second product stream corresponding to the heavy component can be enriched in one or more rejected components, such as $CO_2$ and $N_2$.

Such a separation can be performed with the boron selectivated molecular sieve described herein, which can have a kinetic selectivity allowing $CO_2$ to be adsorbed in preference to $CH_4$. A contactor made using a zeolite adsorbent can be used to selectively adsorb $CO_2$ from an input gas stream containing $CO_2$ and $CH_4$, resulting in an output stream enriched in $CH_4$. For a kinetic adsorbent, the time of the adsorption step can be set by the zeolite crystal size and the $CH_4$ diffusion coefficient. Regeneration of such a kinetic adsorbent can be done with a pressure swing, a temperature swing, a purge, and/or displacement. Use of a kinetic adsorbent that can weakly adsorb $CO_2$ (i.e., having a relatively flat adsorption isotherm) can facilitate regeneration. Highly siliceous zeolites ($SiO_2/Al_2O_3$ molar ratio>~100) can often have these types of weak isotherms. A regeneration process can typically generate a stream enriched in $CO_2$ and depleted in hydrocarbons such as $CH_4$.

Additional Embodiments

Embodiment 1

A composition comprising a molecular sieve having pores defined by channels formed by one or more 8-membered rings of tetrahedrally coordinated atoms and an amorphous deposit of a boron compound on the molecular sieve.

Embodiment 2

The composition of embodiment 1, wherein the molecular sieve is a DDR-type molecular sieve.

Embodiment 3

The composition of any preceding embodiment, wherein the molecular sieve is ZSM-58.

Embodiment 4

The composition of any preceding embodiment, wherein the molecular sieve has a silica to alumina molar ratio in excess of 100.

Embodiment 5

A composition comprising a DDR-type molecular sieve and an amorphous deposit of a boron compound on the molecular sieve.

Embodiment 6

The composition of embodiment 5, wherein the DDR-type molecular sieve has a silica to alumina molar ratio in excess of 100.

Embodiment 7

The composition of any preceding embodiment, comprising from 10 wppm to 10000 wppm elemental boron, such as from 500 wppm to 5000 wppm elemental boron, for example from 1000 wppm to 1300 wppm elemental boron.

Embodiment 8

The composition of any preceding embodiment, wherein the amorphous deposit is produced by treating the molecular sieve with a boron-containing compound and then heating the treated molecular sieve at a temperature of at least 500° C.

Embodiment 9

The composition of any preceding embodiment, having a methane diffusivity of less than about 10E-13 $m^2$/sec at a temperature of about 30° C. and about 0.17 bar (about 17 kPa) methane partial pressure.

Embodiment 10

A DDR-type molecular sieve having a methane diffusivity of less than about 10E-13 $m^2$/sec at a temperature of about 30° C. and about 0.17 bar (about 17 kPa) methane partial pressure.

Embodiment 11

The molecular sieve of embodiment 10, comprising an amorphous deposit of a boron compound.

Embodiment 12

A method for performing a gas separation comprising: contacting the composition of any one of embodiments 1-9 with an input gas stream containing a first component and a second component to form a product gas stream enriched in the first component relative to the input gas stream.

Embodiment 13

A method for performing a gas separation comprising: contacting the molecular sieve of embodiment 10 or embodiment 11 with an input gas stream containing a first component and a second component to form a product gas stream enriched in the first component relative to the input gas stream.

Embodiment 14

The method of embodiment 12 or embodiment 13, wherein the first component is $CH_4$ and the second component is $CO_2$, $N_2$, $H_2S$, or a combination thereof.

EXAMPLES

The invention will now be more particularly described with reference to the following non-limiting Examples and the accompanying drawings.

Examples 1-3

ZSM-58 crystal having a silica to alumina molar ratio of greater than 1000 was produced according to the following synthesis process.

The following reagents were added to a beaker in the following order: deionized water; sodium hydroxide (~50 wt % solution); silica (Ludox™ HS-40); seed crystals; and methyltropinium chloride (MTPCl) as the structure directing agent. The ratios of components in the synthesis mixture are shown below. The synthesis mixture did not include a separate source of alumina.

| | |
|---|---|
| $H_2O:SiO_2$ ratio (molar) | ~19 |
| $OH^-:SiO_2$ ratio (molar) | ~0.11 |
| $Na:SiO_2$ ratio (molar) | ~0.11 |
| $SDA:SiO_2$ ratio (molar) | ~0.13 |
| wt % seeds (grams of seeds/grams of silica in slurry) | ~0.2 wt % |

The gel was allowed to age overnight (about 8-16 hours) at ambient conditions prior to charging the mixture to the crystallizer. The mixture was then charged to an autoclave for heating and mixing. The gels were each stirred at the reaction temperature of ~140° C. for about 4-6 days to produce crystals with the DDR framework as identified by x-ray diffraction.

The as-synthesized molecular sieve was first calcined at ~1000° F. (~538° C.) for ~6 hours in primarily $N_2$ but with a small oxygen content of about 2 vol %. The calcined powder was then exchanged twice with ~0.1N hydrochloric acid at about 95° C. to effect sodium exchange. Chloride was removed as NaCl. Thereafter the exchanged crystal was dried at ~250° F. (~121° C.).

Separate samples of the exchanged and dried crystal were selectivated with ~0.1 wt % boron (Example 1), ~0.2 wt % boron (Example 2), and ~0.5 wt % boron (Example 3). In each case, selectivation was accomplished by initially impregnating the sample with ammonium pentaborate solution, with the impregnation being performed at ~95% of the incipient water pore volume of the exchanged and dried crystal. Once the sample was impregnated, it was dried overnight (about 8-16 hours) at ~250° F. (~121° C.) and then calcined at ~1500° F. (~816° C.).

After calcination, each sample was tested for its $CO_2$ capacity and its methane diffusivity and the results are shown in Table 1 given below.

TABLE 1

| Example | Boron content | $CO_2$ capacity at ~400° C. (mmol/gm) | $CO_2$ capacity at ~100° C. (mmol/gm) | ZLC (m²/sec) |
|---|---|---|---|---|
| 1 | 0.1 wt % | ~1.51 | ~1.55 | ~4.5E−13 |
| 2 | 0.2 wt % | ~1.39 | ~1.38 | <~4E−13 |
| 3 | 0.5 wt % | ~1.37 | ~1.16 | <~4E−13 |

In contrast, the exchanged and dried crystal at a zero boron level had a measured ZLC diffusivity for methane of ~18.0 E-13 m²/sec. Thus, it can be seen from Table 1 that the boron deposition appeared to lead to a large drop in methane diffusivity with increasing boron level. Moreover, although the $CO_2$ capacity appeared to decrease as the boron level increased, the decrease appeared to be relatively small, particularly at ~400° C.

ZLC diffusivity data for the unselectivated ZSM-58 and the boron selectivated materials of Examples 1-3 were generated by the following procedure:

About 30 mg of sample were loaded into the sample cell and reference cell. The sample was outgassed for ~2 hours at ~200° C. in a flow of ~100% helium at a flow rate of ~10 ml/min to remove physisorbed water from the sample. Subsequently, the sample was exposed to a flow of ~10% methane in helium at ~10 ml/min for ~1-2 hours at ~30° C. During this period the sorbate methane was adsorbed by the ZSM-58 sample. The total pressure in the sample line was stabilized at ~1.70 bar (~10 psig), and the pressure difference between the sample and reference line was reduced to about 1 mbar. The methane concentration during the ZLC experiment was detected by mass spectrometry (m/e≈16). Upon switching to helium flow in the sample line, the methane was purged from the sample line and the sample cell resulting in a decline in methane signal detected by the mass spectrometer. The methane signal reached the baseline in about 5 minutes after the first valve switch. Equation 1 describes the relationship between c(t)/c(0) as a function of parameters L, β, D and R:

$$\ln\left(\frac{c(t)}{c0}\right) = \ln\left(2L \sum_{n=1}^{\infty} \frac{\exp(-\beta_n^2 Dt/R^2)}{[\beta_n^2 + L(L-1)]}\right) \quad (1)$$

where c(t) represents the concentration of the sorbate at time t; c(0) represents the initial concentration of the sorbent (before the 1st valve switch); D represents the sorbate diffusivity; R represents the crystal radius; and parameter L is defined in equation 2 below:

$$L = \frac{FR^2}{3KVD} \quad (2)$$

where F represents the flow rate of the sorbate gas; K represents Henry's constant; V represents the sample volume; and D and R are the same as in equation 1. The values for L, D, K, and β were obtained from a least square fit of the experimental curve in FIG. 1 using equation 1, with V and R being input parameters. FIG. 1 shows a plot of ln(c/c0) versus time for the parent ZSM-58 sample and the three boron selectivated ZSM-58 samples. Methane diffusivities as determined by curve fitting using equation (1) appeared to decrease with increasing boron content.

Evaluation of the ZLC curves shown in FIG. 1 using the method described above yielded methane diffusivities of ~18E-13 m$^2$/s for the parent DDR material, and ~4.5E-13 m$^2$/s for the DDR containing ~0.1% B. Further increase in B content to ~0.2% B and ~0.5% B resulted in methane diffusivities below ~4E-13 m$^2$/s. The decline in fitted Henry constant for the ~0.2% B and the ~0.5% B containing samples to ~6 and ~3, respectively, suggested that these materials may have a lower methane capacity than the starting DDR material.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A composition comprising a molecular sieve having pores defined by channels formed by one or more 8-membered rings of tetrahedrally coordinated atoms and an amorphous deposit of a boron compound on the molecular sieve.

2. The composition of claim 1, wherein the molecular sieve is a DDR-type molecular sieve.

3. The composition of claim 1, wherein the molecular sieve is ZSM-58.

4. The composition of claim 1, wherein the molecular sieve has a silica to alumina molar ratio in excess of 100.

5. The composition of claim 1, comprising from 10 wppm to 10000 wppm elemental boron.

6. The composition of claim 1, comprising from 500 wppm to 5000 wppm elemental boron.

7. The composition of claim 1, comprising from 1000 wppm to 1300 wppm elemental boron.

8. The composition of claim 1, wherein the amorphous deposit is produced by treating the molecular sieve with a boron-containing compound and then heating the treated molecular sieve at a temperature of at least 500° C.

9. A composition comprising a DDR-type molecular sieve and an amorphous deposit of a boron compound on the molecular sieve.

10. The composition of claim 9, wherein the DDR-type molecular sieve has a silica to alumina molar ratio in excess of 100.

11. The composition of claim 9, comprising from 10 wppm to 10000 wppm elemental boron.

12. The composition of claim 9, comprising from 500 wppm to 5000 wppm elemental boron.

13. The composition of claim 9, comprising from 1000 wppm to 1300 wppm elemental boron.

14. The composition of claim 9, wherein the amorphous deposit is produced by treating the molecular sieve with a boron-containing compound and then heating the treated molecular sieve at a temperature of at least 500° C.

15. The composition of claim 9, having a methane diffusivity of less than about 10E-13 m$^2$/sec at a temperature of about 30° C. and about 0.17 bar (about 17 kPa) methane partial pressure.

16. A DDR-type molecular sieve having a methane diffusivity of less than about 10E-13 m$^2$/sec at a temperature of about 30° C. and about 0.17 bar (about 17 kPa) methane partial pressure.

17. The molecular sieve of claim 16, comprising an amorphous deposit of a boron compound.

18. A method for performing a gas separation comprising: contacting the composition of claim 1 with an input gas stream containing a first component and a second component to form a product gas stream enriched in the first component relative to the input gas stream.

19. The method of claim 18, wherein the first component is $CH_4$ and the second component is $CO_2$, $N_2$, $H_2S$, or a combination thereof.

20. A method for performing a gas separation comprising: contacting the composition of claim 9 with an input gas stream containing a first component and a second component to form a product gas stream enriched in the first component relative to the input gas stream.

21. The method of claim 20, wherein the first component is $CH_4$ and the second component is $CO_2$, $N_2$, $H_2S$, or a combination thereof.

22. A method for performing a gas separation comprising: contacting the molecular sieve of claim 16 with an input gas stream containing a first component and a second component to form a product gas stream enriched in the first component relative to the input gas stream.

23. The method of claim 22, wherein the first component is $CH_4$ and the second component is $CO_2$, $N_2$, $H_2S$, or a combination thereof.

* * * * *